US012340129B2

United States Patent
Hwangbo et al.

(10) Patent No.: US 12,340,129 B2
(45) Date of Patent: Jun. 24, 2025

(54) OPTIMIZING MEMORY SIZE

(71) Applicant: Hewlett-Packard Development Company, L.P., Spring, TX (US)

(72) Inventors: Joon Hyung Hwangbo, Seongnam Si (KR); Hyun Ji Kim, Seongnam Si (KR); Ji Hoon Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/561,015

(22) PCT Filed: Nov. 3, 2021

(86) PCT No.: PCT/US2021/057819
§ 371 (c)(1),
(2) Date: Nov. 15, 2023

(87) PCT Pub. No.: WO2022/245389
PCT Pub. Date: Nov. 24, 2022

(65) Prior Publication Data
US 2024/0256194 A1    Aug. 1, 2024

(30) Foreign Application Priority Data
May 21, 2021    (KR) .................. 10-2021-0065252

(51) Int. Cl.
*G06F 3/12*    (2006.01)
(52) U.S. Cl.
CPC ............ *G06F 3/122* (2013.01); *G06F 3/1224* (2013.01); *G06F 3/1279* (2013.01); *G06F 3/1204* (2013.01)

(58) Field of Classification Search
None
See application file for complete search history.

(56) References Cited

U.S. PATENT DOCUMENTS

| | | |
|---|---|---|
| 8,854,680 B2 | 10/2014 | Bellert |
| 9,395,754 B2 | 7/2016 | Cronin |
| 9,678,868 B2 | 6/2017 | Qiu et al. |
| 10,310,586 B2 * | 6/2019 | Biswas ................. G09G 5/395 |
| 10,678,439 B2 | 6/2020 | Frolikov |
| 2001/0043725 A1 | 11/2001 | Ueda |
| 2006/0092470 A1 | 5/2006 | Yamada |
| 2007/0216696 A1 | 9/2007 | Capper et al. |
| 2009/0091564 A1 | 4/2009 | Raju |
| 2022/0357899 A1 * | 11/2022 | Ogawa ............... H04N 1/00941 |

FOREIGN PATENT DOCUMENTS

JP    2003-080772 A    3/2003

* cited by examiner

*Primary Examiner* — Darryl V Dottin
(74) *Attorney, Agent, or Firm* — Brooks, Cameron & Huebsch, PLLC

(57) ABSTRACT

An example image forming apparatus includes an input interface, an output interface, a memory, and a processor. The processor is to output information related to whether a function of the image forming apparatus is enabled through the output interface, based on the function of the image forming apparatus being disabled, output information indicating whether a size of the memory corresponding to the disabled function is allocated, and based on receiving a signal to remove a memory size allocated to the disabled function through the input interface, remove the memory size allocated to the disabled function and adjusts an allocation state of the memory size to a user setting state.

15 Claims, 12 Drawing Sheets

FIG. 3

| Settings | |
|---|---|
| Memory Adjust | ■ SCAN |
| Memory Adjust Scan Detail > | ☐ FAX |
| Memory Adjust Fax Detail > | ▨ PRINT |
| Memory Adjust Print Detail > | |

MEMORY SWITCHABLE TO SOLUTION : 20MB

[APPLY] [DEFAULT] [CANCEL]

FIG. 5A

```
reserved-memory {
    #address-cells  =<2>;
    #size-cells     =<2>;
    ranges;

segment_scan_rm: segment_scan_rm@0 {
        // The size, in bytes, of this physically contiguous segment
        size     =<0 0x30000000>; // The size can be overlayed by user adjust
        no-map;
    };

segment_fax_rm: segment_fax_rm@0 {
        // The size, in bytes, of this physically contiguous segment
        size     =<0 0x01000000>; // The size can be overlayed by user adjust
        no-map;                       12
    };

segment_print_rm: segment_print_rm@0 {
        // The size, in bytes, of this physically contiguous segment
        size     =<0 0x20000000>; // The size can be overlayed by user adjust
        no-map;
    };

segment_solution_rm: segment_solution_rm@0 {
        // The size, in bytes, of this physically contiguous segment
        size     =<0 0x0>; // The size can be overlayed by user adjust
        no-map;
    };
};
```

11 (label on segment_fax_rm: segment_fax_rm@0)

FIG. 5B

```
reserved-memory {
    #address-cells  =<2>;
    #size-cells     =<2>;
    ranges;

segment_scan_rm: segment_scan_rm@0 {
        // The size, in bytes, of this physically contiguous segment
        size            =<0 0x25000000>; // The size can be overlayed by user adjust
        no-map;
    };

segment_fax_rm: segment_fax_rm@0 {──11
        // The size, in bytes, of this physically contiguous segment
        size            =<0 0x0>; // The size can be overlayed by user adjust
        no-map;         └─13
    };

segment_print_rm: segment_print_rm@0 {
        // The size, in bytes, of this physically contiguous segment
        size            =<0 0x17000000>; // The size can be overlayed by user adjust
        no-map;
    };

segment_solution_rm: segment_solution_rm@0 {
        // The size, in bytes, of this physically contiguous segment
        size            =<0 0x09000000>; // The size can be overlayed by user adjust
        no-map;
    };
```

FIG. 6

| Memory segment | Size |
|---|---|
| Segmgent_scan_rm@0 | 0x25000000 |
| Segment_print_rm@0 | 0x17000000 |
| Segment_fax_rm@0 | 0x0 |
| Segment_solution_rm@0 | 0x09000000 |

FIG. 7

| Settings | |
|---|---|
| Memory Adjust Temporary Function | ● TEMPORARY FUNCTION USABLE<br>○ TEMPORARY FUNCTION NOT USABLE |

FIG. 8

| Settings | | |
|---|---|---|
| Memory Adjust | ▨ SCAN | |
| Memory Adjust Scan Detail > | ☐ FAX | |
| Memory Adjust Fax Detail > | ▨ PRINT | |
| Memory Adjust Print Detail > | | |

MEMORY SWITCHABLE TO SOLUTION : 20MB

[ APPLY ] [ DEFAULT ] [ CANCEL ]

OPTIMIZING MEMORY SIZE

BACKGROUND

An image forming apparatus may include an apparatus to print data generated by a terminal device, such as a computer, on a printing medium such as paper. Examples of the image forming apparatus may include a copier, a printer, a facsimile, a scanner, or a multi-function peripheral (MFP) device that combines functions thereof through a single apparatus.

BRIEF DESCRIPTION OF THE DRAWINGS

Various examples will be described below by referring to the following figures.

FIG. 3 is a diagram illustrating a user interface (UI) for removing a memory size allocated to a function of an image forming apparatus according to an example;

FIGS. 5A and 5B are diagrams illustrating a memory device tree according to a change of a memory size according to an example;

FIG. 6 is a diagram illustrating a memory table according to an example;

FIGS. 7 and 8 are diagrams illustrating an option UI for setting temporary use a function of an image forming apparatus according to an example;

DETAILED DESCRIPTION

Hereinafter, various examples will be described with reference to the drawings. The examples described below may be modified and implemented in various different forms.

In the present disclosure, an element that is referred to as being "connected" with another element may include cases of being directly connected, and also include cases of being connected indirectly, for example with another element therebetween. Also, an element that is referred to as "including" another element indicates that the element may not exclude another element and may further include additional elements, unless specifically stated otherwise. Each example may be implemented or operated independently, or each example may be implemented or operated in combination.

In the present disclosure, the term "image forming job" may refer to various jobs (e.g., copying, printing, scanning, or faxing) related to an image, such as forming the image or generating/storing/transmitting an image file, and the term "job" may refer to the image forming job in some examples, and may also refer to a series of processes for performing the image forming job in other examples.

In addition, the term "print data" may refer to data converted into a printable format by the printer. Based on the printer supporting direct printing, the file itself may be print data.

Also, the term "image forming apparatus" may refer to an apparatus that prints print data generated by a terminal apparatus such as a computer on a recording medium such as paper. Examples of such an image forming apparatus include a copier, a printer, a facsimile, a scanner, a multi-function peripheral (MFP) that combines functions thereof through a single apparatus, or the like.

The term "memory size" refers to the overall capacity of a memory included in the image forming apparatus or the capacity of the memory allocated to a specific function. For example, the memory size of a fax function may refer to the memory capacity allocated to the fax function from the entire memory capacity of the image forming apparatus.

Further, the expression "user" as used herein may refer to a person who performs a manipulation related to an image forming job using the image forming apparatus or a device connected to the image forming apparatus by wire or wirelessly. Further, the expression "manager" as used herein may refer to a person who has an authority to access all the functions and systems of the image forming apparatus. The "manager" and the "user" may refer to the same person.

Examples of the present disclosure are for optimizing a memory size by adjusting the memory size assigned to a function of the image forming apparatus in accordance with the needs of a user within a limited memory size without adding a new memory.

Figure 1:
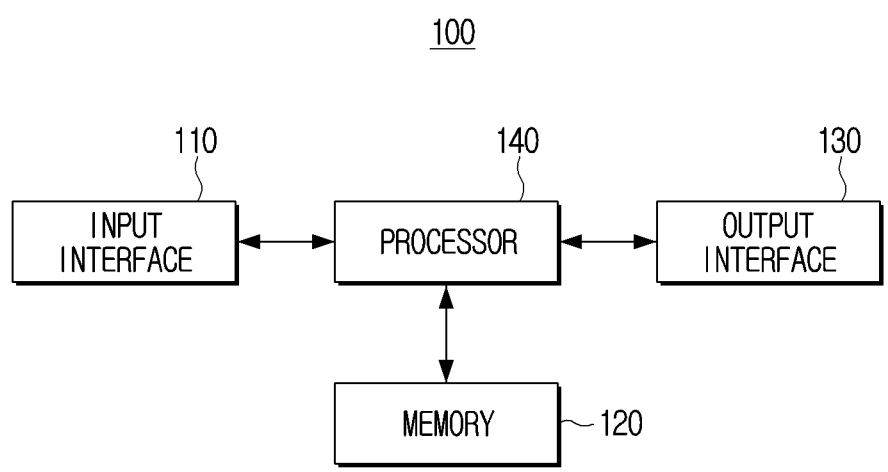
FIG. 1 is a diagram illustrating an image forming apparatus according to an example.

FIG. 1 is a block diagram illustrating an image forming apparatus according to an example.

Referring to FIG. 1, an image forming apparatus 100 may include an input interface 110, a memory 120, an output interface 130, and a processor 140.

The input interface 110 may receive a function selection and a control command for a corresponding function from a user. The input interface 110 may receive a command to enable or disable a function of the image forming apparatus 100. For example, the function of the image forming apparatus 100 may include a fax function, a print function, a copy function, a scan function, and the like. Examples of specific functions of the fax function may include resolution, concentration, sharpness, magnification, double-sided, paper selection, preview, work termination notification, and the like. Examples of specific functions of the print function may include magnification, paper selection, double-sided printing, concentration, black/white color, high-speed printing, and the like. Examples of specific functions of the scan function may include black/white color, resolution, paper selection, double-sided scan, high-speed scan, optical character reader (OCR), and the like. The input interface 110 may be implemented as a keyboard, a keypad, a touchpad, a touch screen, and the like. The input interface 110 may be referred to as an input unit, an input module, an input device, an input/output unit, and the like. Alternatively, the input interface 110 may be implemented as a communication interface. For example, the image forming apparatus 100 may receive a function selection and a control command for a corresponding function from an external electronic device through the input interface 110 implemented as a communication interface.

The memory 120 may store an instruction regarding the image forming apparatus 100. For example, the memory 120 may store various programs (e.g., machine readable instructions) to operate the image forming apparatus 100 according to various examples. The memory 120 may store information about a size of a memory for a function enabled in the image forming apparatus 100.

The output interface 130 may output a user interface window as a result of an execution of a program (e.g., an application). The output interface 130 may output information related to whether a function of the image forming apparatus 100 is enabled by control of the processor 140, information indicating whether a memory size corresponding to a disabled function is allocated based on the function of the image forming apparatus 100 being disabled, an option menu for selecting whether the disabled function from which the memory size is removed may be temporarily used or not, and the like. The output interface 130 may output a size of an available memory. The output interface 130 may output a copy function, a scan function, a fax function, a print function, a menu capable of restricting a memory usage of a fax function, a menu for removing a memory allocated to a disabled function, a memory size capable of being secured, and the like. The output interface 130 may be implemented as a display. The display may be a touch screen such as a liquid crystal display (LCD), a cathode-ray tube (CRT), an organic light emitting diode (OLED), a display in a flexible form, or the like, and may be implemented as a touch screen that may simultaneously perform a function of the input interface 110, examples of which will be described later. The output interface 130 may be implemented as a communication interface. For example, the image forming apparatus 100 may transmit information related to whether a function of the image forming apparatus 100 is enabled by an external electronic device through the output interface 130 implemented as a communication interface, information indicating whether a memory size corresponding to a disabled function is allocated based on the function of the image forming apparatus 100 being disabled, an option menu for selecting whether the memory size may be temporarily used or not, and the like. Based on the input interface 110 and the output interface 130 being implemented as a communication interface, the input interface 110 and the output interface 130 may be implemented as a communication interface performing a transceiving function. The communication interface may be referred to as a communication unit, a communication module, a communication device, a transceiver, or the like The processor 140 may control an operation of the image forming apparatus 100. Based on power initially being supplied to the image forming apparatus 100, the processor 140 may boot the image forming apparatus 100 and identify an enabled function. The processor 140 may set a memory size corresponding to each function enabled based on the enabled function.

The image forming apparatus 100 may receive a command to disable an enabled function through the input interface 110. The user may detect whether the function of the image forming apparatus 100 is enabled or disabled based on information, output through the output interface 130, related to whether the function of the image forming apparatus 100 is enabled. However, even though the image forming apparatus 100 may disable the function, a size of the memory may be maintained. Based on the function of the image forming apparatus 100 being disabled, the user may detect whether the memory size for the disabled function is allocated based on the information indicating whether the memory size corresponding to the disabled function output through the output interface 130 is allocated. For example, information indicating whether a memory size corresponding to a disabled function is allocated may include a user interface (UI) related to setting a memory size. The setting UI may indicate whether a memory size corresponding to the disabled function is allocated. The setting UI may receive a command to remove a memory size allocated to each disabled function or a specific function of the image forming apparatus 100. As an example, the setting UI may include a scan function, a fax function, a print function, and an item to remove the memory size allocated to the disabled function. Upon receiving a command to remove the memory size allocated to the disabled function, the processor 140 may remove the memory size allocated to the disabled function to adjust the memory size allocation state to the user setting state. Based on the image forming apparatus 100 receiving control from an external electronic device, the processor 140 may receive a command for disabling the enabled function through the input interface 110 implemented as a communication interface from the external electronic device. The processor 140 may transmit information indicating whether the function of the image forming apparatus 100 is enabled or whether a memory size corresponding to the disabled function is allocated to the external electronic device through the output interface 130 implemented by the communication interface.

As an example, based on the processor 140 receiving a removal command of a memory size allocated to a disabled fax function from a user on a setting UI, the processor 140 may adjust a memory size that is set (e.g., allocated) to the fax function to a minimum memory size (e.g., 0 bytes). The processor 140 may generate a memory table that includes an adjusted memory size corresponding to the fax function. The generated memory table may be stored in the memory 120. The processor 140 may reboot the image forming apparatus 100 and assign a memory size to each function based on the generated memory table. The processor 140 may use the generated memory table for configuring the memory 120 by using a device tree overlay (dtoverlay) method. Based on the processor 140 receiving a memory size removal command allocated to the disabled function of the image forming apparatus 100 through the input interface 110, the processor 140 may adjust the allocated memory size to the user setting state. The processor 140 may not operate the disabled function by setting the processor 140 not to receive an input for the disabled function.

For example, the memory size secured by the disabling of the function of the memory size allocated to the basic memory size may be reserved as a solution memory pool to be used for memory management for other solutions (e.g., applications). As an example, based on two screens for solutions and embedding being provided, the processor 140 may allocate a graphic memory for the solution screen in the memory pool, which may address an issue in which screen switching becomes slow due to the lack of memory based on switching the screen. The processor 140 may avoid memory competition with the basic system memory by allocating the memory size in the memory pool during the solution operation.

In an example, the image forming apparatus 100 may temporarily operate the disabled function, from which the memory size has been removed, under limited conditions. As an example, the processor 140 may display an option UI for selecting whether a disabled function, from which the memory size has been removed according to a user's selection, is to be temporarily usable. For example, if the disabled fax function, from which the memory size is removed, is selected to be temporarily usable, the processor 140 may temporarily operate the fax function under a limited condition, and select the fax function. Based on the fax function being disabled, a user who wants to use the fax function may logon to the image forming apparatus 100. If the disabled fax function is selected by the logged-on user, the processor 140 may reboot the image forming apparatus 100. The memory size may be temporarily allocated to the disabled fax function from which the memory size has been removed, to enable the disabled fax function. If the user using the fax function is logged out, the processor 140 may reboot the image forming apparatus 100. The processor 140 may disable the fax function by adjusting the memory size of the temporarily enabled fax function again. The processor 140 may remove the memory size temporarily allocated to the disabled function to disable the temporarily enabled function.

Figure 2:
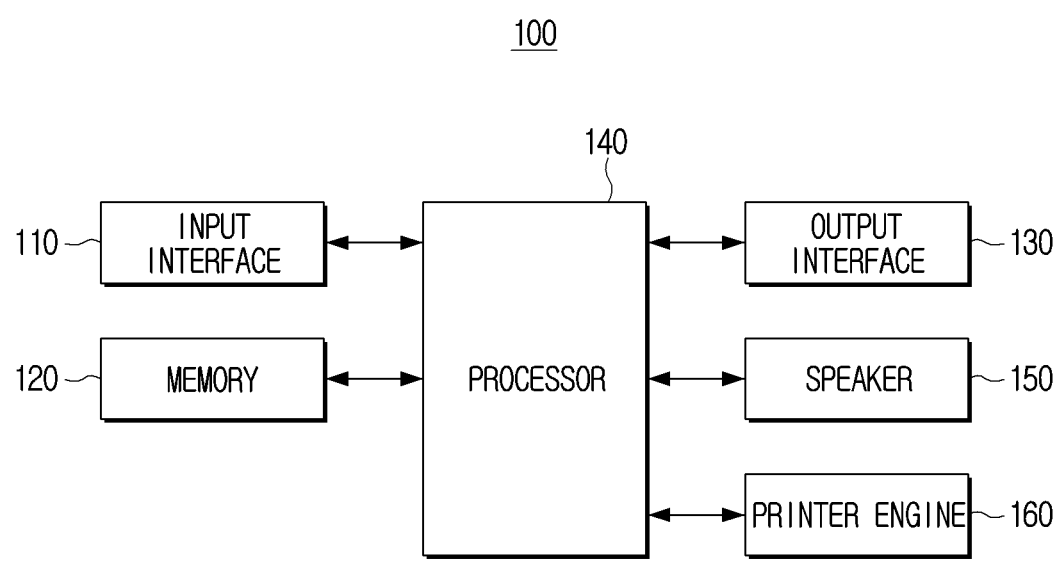
FIG. 2 is a block diagram illustrating an image forming apparatus according to an example.

FIG. 2 is a block diagram illustrating an image forming apparatus according to an example.

Referring to FIG. 2, the image forming apparatus 100 may include the input interface 110, the memory 120, the output interface 130, the processor 140, a speaker 150, and a printer engine 160. The input interface 110, the memory 120, and the output interface 130 perform the same functions as the input interface 110, the memory 120, and the output interface 130 of FIG. 1, respectively and a redundant description will be omitted. Since the processor 140 performs a similar function with the processor 140 of FIG. 1, the contents described in FIG. 1 will not be duplicated, and the contents related to the elements added in FIG. 2 will be described below.

The speaker 150 may output state information of the image forming apparatus 100 as sound. For example, if the image forming apparatus 100 is in an error state, a sound corresponding to an error state may be output. Alternatively, the speaker 150 may output voice data converted into voice or voice data of having an audio format.

The printer engine 160 may form an image. For example, the printer engine 160 may print a print image generated by the processor 140 on a printing medium. The printer engine 160 may perform printing in an electrophotographic manner, an inkjet manner, and the like. The printer engine 160 may be a mono printer engine capable of printing one color or may be a color printer engine capable of color printing.

Example elements of the image forming apparatus 100 have been described. Hereinafter, an example process of adjusting a memory size in an image forming apparatus will be described.

Figure 4:
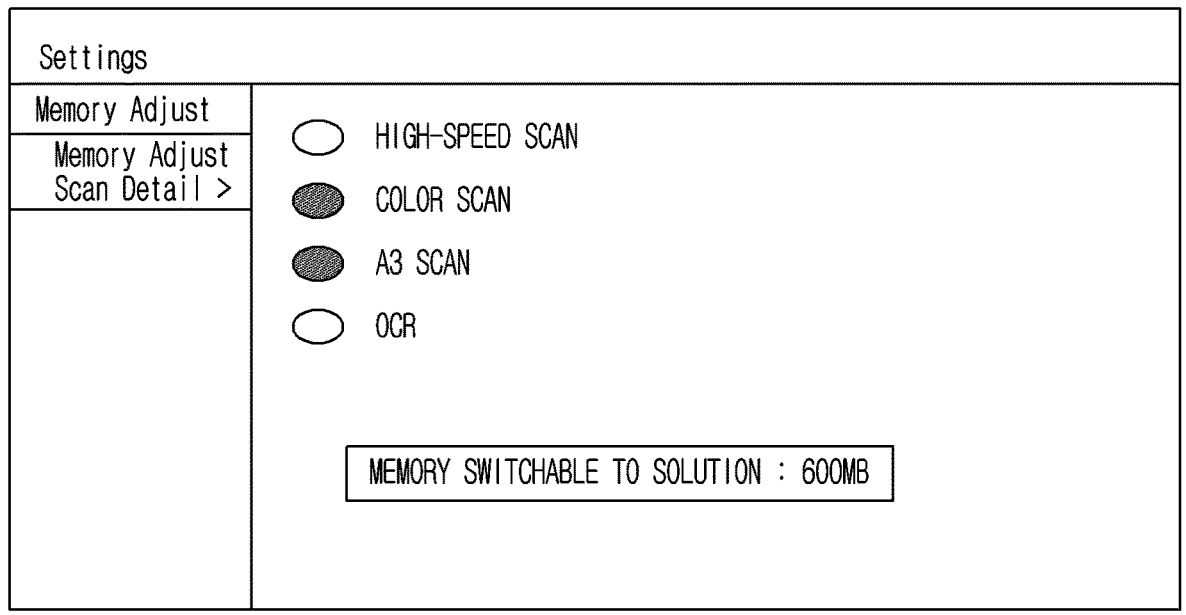
FIG. 4 is a diagram illustrating a UI for removing a memory size allocated to a specific function of an image forming apparatus according to an example.

FIG. 3 is a diagram illustrating a UI for removing a memory size allocated to a function of an image forming apparatus according to an example, FIG. 4 is a diagram illustrating a UI for removing a memory size allocated to a specific function of an image forming apparatus according to an example.

Referring to FIG. 3, a memory setting UI for removing a memory size allocated to a function of an image forming apparatus is illustrated. For example, the memory setting UI may include a scan function, a fax function, and a print function. The image forming apparatus may receive a user's selection on the memory setting UI. The image forming apparatus is capable of turning on/off each function according to the selection of a user, activating a function selected to be on to allocate a memory size, and removing a memory size of a disabled function. Alternatively, the image forming apparatus may simultaneously perform disabling of the function selected to be off and removing the memory size. As an example, as shown in FIG. 3, the image forming apparatus may enable the scan function and the print function according to the user's selection and disable the fax function. The image forming apparatus may allocate a memory size to the scan function and the print function, and may remove a memory size allocated to the fax function.

Based on the memory size allocated to the fax function being removed, the image forming apparatus may display the remaining memory size that is switchable. Alternatively, the image forming apparatus may display a remaining memory size including a memory size allocated to a fax function.

The image forming apparatus may individually allocate/remove the memory size with respect to the specific function of each function. The setting UI may include a menu for enabling/disabling the specific items of each function. For example, based on a user selecting a specific item of a scan function, the image forming apparatus may display a specific item setting UI that receives an enabling/disabling command for a specific item of the scan function, as shown in FIG. 4. Alternatively, the specific item setting UI may receive a command to remove the memory size allocated to the disabled specific function. For example, the scan function may include a high-speed scan, a color scan, an A3 scan, an OCR function, and the like, and the image forming apparatus may differently adjust the memory usage amount depending on whether each function is used. As shown in FIG. 4, based on the user turning off the high-speed scan and OCR, the image forming apparatus may switch the memory size allocated for high-speed scan and OCR to an extra memory size. Alternatively, the specific item setting UI may receive a command to remove the memory size assigned to the disabled high-speed scan and the OCR function. The image forming apparatus may switch a memory occupied for each function to an extra memory size to use as a memory for other solutions (e.g., applications).

The image forming apparatus may simultaneously disable the UI item of the corresponding function based on the function item being turned off by the user. Based on an application item being selected, the image forming apparatus may display a reboot guide screen and apply a setting of a memory size selected by a user after rebooting. The image forming apparatus may adjust the size of the previously set memory to the user setting state based on the disabled function. The image forming apparatus may apply information of a memory size adjusted to a user setting state to a device tree using a device tree overlay (dtoverlay) method, and apply the adjusted memory size to a user setting state after rebooting.

FIGS. 5A and 5B are diagrams illustrating a memory device tree according to a change of a memory size according to an example, and FIG. 6 is a diagram illustrating a memory table according to an example.

Referring to FIG. 5A, a device tree for a memory segment reserved for a fax function, a scan function, and a print function is illustrated. For example, a Linux kernel may reserve the memory device tree by functions with memory pool using segment scan, segment fax, segment print size information displayed on the device tree during booting. For example, as shown in FIG. 5A, since the value of 0x01000000 (about 16 MB) 12 is set in the segment fax 11, the image forming apparatus may allocate a memory size of about 16 MB to the fax function. The image forming apparatus may allocate a memory size in a similar manner to a scan function, a print function, and a solution.

Referring to FIG. 6, a memory table adjusted to a memory size corresponding to a function disabled by a user's selection is illustrated. The image forming apparatus may adjust the memory size for the disabled function and store the adjusted memory size in the memory. The existing segment memory size may be reduced as much as the memory size secured in accordance with the disabling of the function. If the entire corresponding function is disabled, the corresponding memory size may be zero. Based on a memory table being generated in a user setting state, the image forming apparatus may read the stored memory table after rebooting. If the memory size of the memory table is different from the existing memory size, the image forming apparatus may overlay the existing memory size information with the changed memory size information in the memory size information of each segment using a device tree overlay function. As shown in FIG. 5B, the image forming apparatus may adjust the memory segment size for each function using the overlaid memory device tree. For example, based on the entire fax function being disabled, the image forming apparatus may adjust the value of the segment fax 11 from existing 0x01000000 (about, 16 MB) (12, FIG. 5A) to 0x0 13.

The image forming apparatus may secure the memory size by adjusting the basic memory according to the use environment of the user, and may switch the memory size secured to be used for the installed solution to the solution memory pool. As an example, the memory size secured in accordance with the disabling of the fax function may be added to the solution memory segment, as shown in FIG. 6. The added solution memory segment may be secured to the memory pool space for the solution after rebooting, and the image forming apparatus may assign the memory size from the solution memory pool.

The disabled function may be temporarily used in a limited condition.

FIGS. 7 and 8 are diagrams illustrating an option UI for setting temporary use a function of an image forming apparatus according to an example.

Referring to FIG. 7, there is shown an option UI in which a memory size is removed and whether to use a disabled function temporarily is selectable. Based on the memory size being removed and the temporary use of the disabled function is selected to be on, the image forming apparatus may operate the disabled function under certain conditions. For example, based on the scan function being set to be temporarily usable while the scan function is disabled, the user may log-on and use a scan function set to be temporarily usable. If the scan function set to be temporarily used is selected, the image forming apparatus may temporarily change the memory setting state to the existing setting state (e.g., a default setting state) and perform rebooting. A temporary available scan function may be used after rebooting. The image forming apparatus may display a guide indicating that the temporarily usable function may be used in the current log-on state. Based on the user logging out, the image forming apparatus may perform rebooting to change the memory setting state to the user setting state from the existing setting state.

The image forming apparatus may differently display an item of an enabled function, an item of a disabled function, and an item of a disabled function that may be temporarily used. For example, as shown in FIG. 8, the image forming apparatus may display an item of an enabled print function as dark (e.g., black), an item of a disabled fax function as light (e.g., white), and gray for a scan function which is set to be disabled but is temporarily usable. The above method and colors are merely examples, and the image forming apparatus may display each item differently according to an allowable range such as a letter color, a font, a letter size, a highlight, and the like. If it is determined that the temporary use is not available, the UI of the function may be disabled and temporary use is not possible.

Figure 9:
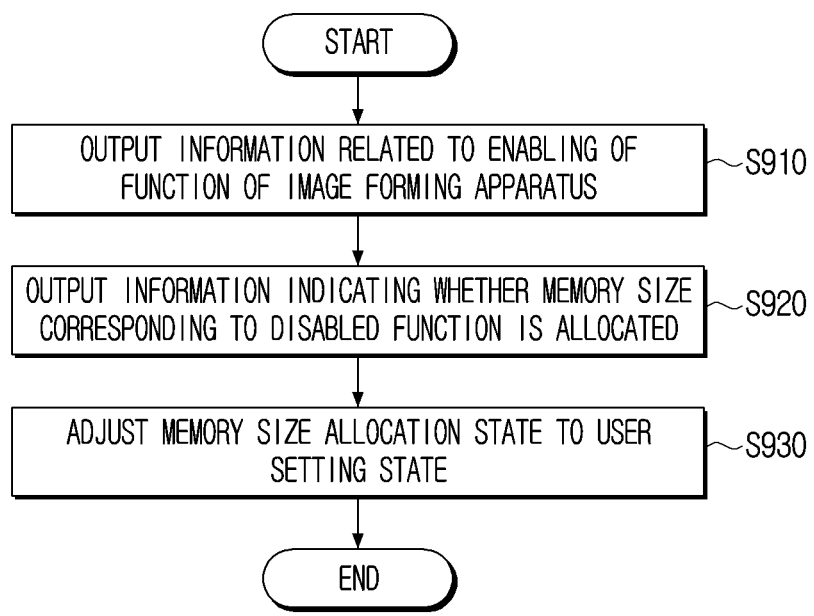
FIG. 9 is a flowchart illustrating a process of adjusting a memory size according to an example.

FIG. 9 is a flowchart illustrating a process of adjusting a memory size according to an example.

Referring to FIG. 9, the image forming apparatus may output information related to enabling of a function of the image forming apparatus in operation S910. For example, the function of the image forming apparatus may include a fax function, a print function, a scan function, or the like.

The image forming apparatus may output information indicating whether the memory size corresponding to the disabled function is allocated based on the function of the image forming apparatus being disabled in operation S920. For example, the image forming apparatus may output a setting UI indicating whether the fax function, the print function, the scan function, and the like, are enabled/disabled and whether a memory size is allocated. The image forming apparatus may output a UI indicating whether a specific function of each function is enabled or disabled, and whether the memory size is allocated. For example, the specific function of the fax function may include resolution, concentration, sharpness, magnification, double-sided, paper selection, preview, work termination notification, and the like. The specific function of the print function may include magnification, paper selection, double-sided printing, concentration, black/white/color, high-speed printing, and the like. The specific function of the scan function may include black/white/color, resolution, paper selection, double-sided scan, high-speed scan, OCR, and the like. The image forming apparatus may selectively remove a memory size allocated to a specific function of a disabled function or an entire disabled function according to a user's selection.

When a signal for removing the memory size allocated to the disabled function is input, the image forming apparatus may remove the memory size allocated to the disabled function to adjust the memory size allocation state to the user setting state in operation S930. The image forming apparatus may display a size of a memory usable in an allocation state of a current memory. The image forming apparatus may generate a memory table including the adjusted size of the memory. The image forming apparatus may overlay the segment of the memory device tree and the corresponding memory size based on the memory table generated after rebooting. The image forming apparatus may allocate a memory size based on a memory device tree overlaid with a memory size.

The image forming apparatus may display an option UI with which a memory size may be removed and a temporary use of the disabled function may be selected. If the user logs on and the disabled function is selected in a state where the disabled function is set to be temporarily usable, the image forming apparatus may perform rebooting and may temporarily allocate and enable the memory size to the disabled function. The image forming apparatus may temporarily allocate and enable the memory to the selected function. If the user logs out, the image forming apparatus may perform rebooting to remove the memory size temporarily allocated to the temporarily enabled function and perform disabling. The image forming apparatus may adjust the allocation state of the memory to the user setting state by removing the memory size temporarily allocated to the disabled function.

The image forming apparatus may display an item of the enabled function, an item of the disabled function, and an item of the temporarily usable disabled function to be different from each other.

Figure 10:
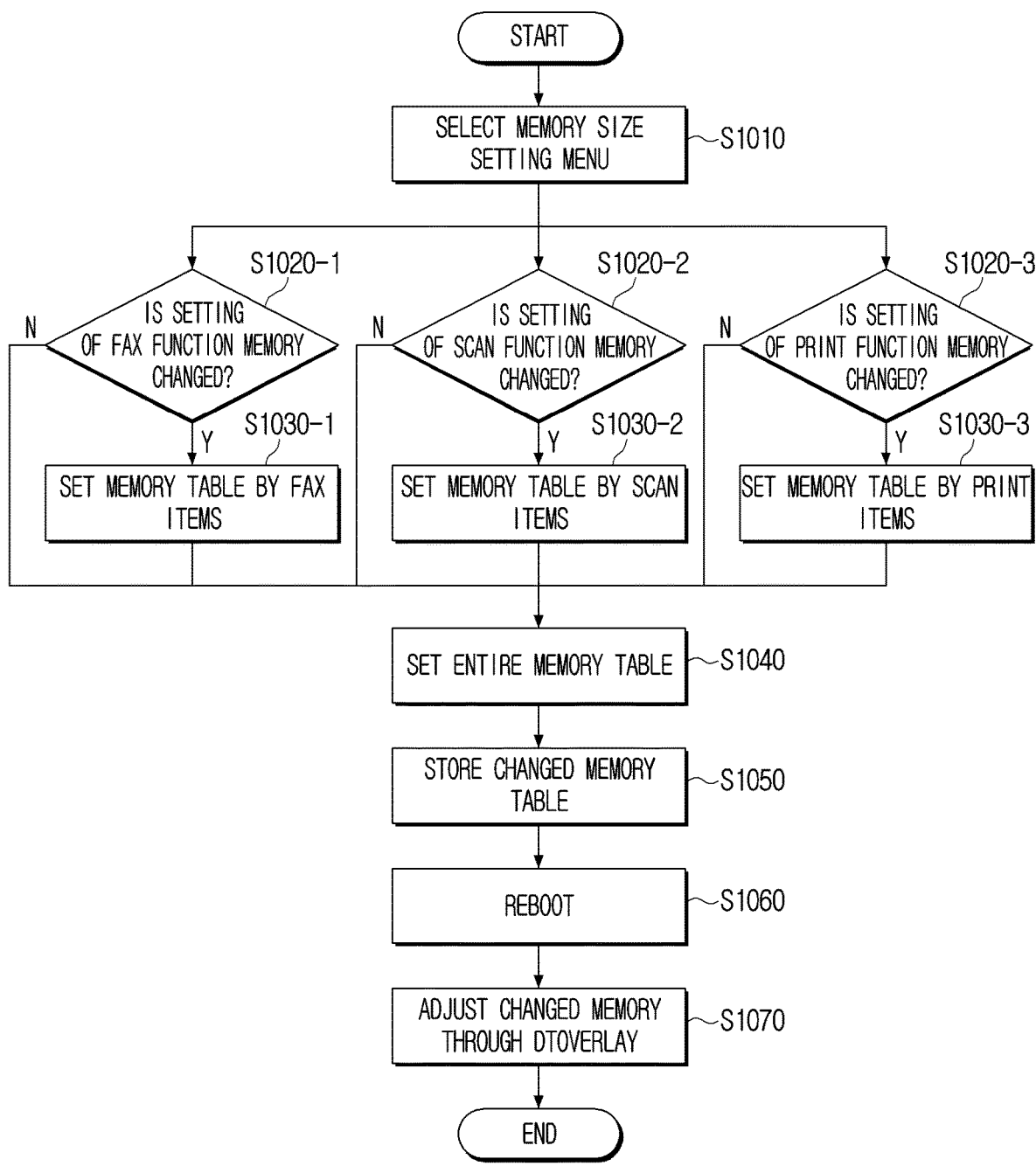
FIG. 10 is a flowchart illustrating a process of adjusting a memory size according to an example; and, FIG. 11 is a diagram illustrating instructions stored in a non-transitory computer-readable recording medium according to an example.

FIG. 10 is a flowchart illustrating a process of adjusting a memory size according to an example.

Referring to FIG. 10, the image forming apparatus may display a memory setting UI according to a user's selection in operation S1010. As an example, the image forming apparatus may display a memory size setting menu capable of setting a memory size. The image forming apparatus may receive a user command for changing a memory size on the displayed setting menu.

The image forming apparatus may detect whether to change a memory size of each function. For example, the image forming apparatus may detect whether the memory size of the fax function is changed in operation S1020-1, detect whether the memory size of the scan function is changed in operation S1020-2, and detect whether the memory size of the print function is changed in operation S1020-3. Based on the memory size of each function being changed, the image forming apparatus may generate a memory table for each corresponding function. For example, if it is determined that the memory size of the fax function is changed, the image forming apparatus may generate a memory table for each fax item in operation S1030-1. If it is determined that the memory size of the scan function is changed, the image forming apparatus may generate a memory table for each scan item in operation S1030-2. If it is determined that the memory size of the print function is changed, the image forming apparatus may generate a memory table for each print item in operation S1030-3. If the setting of the memory size of the specific function is not changed, the image forming apparatus may skip a process of generating a memory table of a specific function.

The image forming apparatus may generate the entire memory table based on the memory table generated for each individual function in operation S1040. For example, the image forming apparatus may generate an entire memory table including a fax function, a scan function, and a memory size of a print function. The image forming apparatus may store the changed memory table in operation S1050. The image forming apparatus may perform rebooting in operation S1060, and adjust the changed memory using a dtoverlay method based on the changed memory table in operation S1070.

Figure 11:
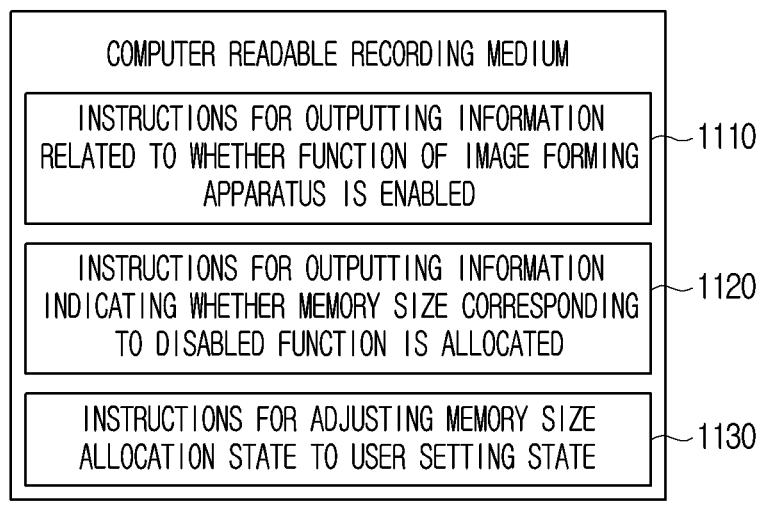

FIG. 11 is a diagram illustrating instructions stored in a non-transitory computer-readable recording medium according to an example.

An example memory size setting process performed in an image forming apparatus described above may be embodied in a form of non-transitory computer readable storage media for storing instructions or data executable by a computer or processor. A non-transitory computer-readable recordable medium 1100 may store instructions related to the example operation of the image forming apparatus described above. For example, the non-transitory computer-readable recording medium 1100 may include instructions 1110 for outputting information related to whether a function of the image forming apparatus is enabled, instructions 1120 for outputting information indicating whether a memory size corresponding to the disabled function is allocated, and instructions 1130 for adjusting the memory size allocation state to a user setting state by removing the memory size allocated to the disabled function.

Such non-transitory computer-readable recordable media may include read-only memory (ROM), random-access memory (RAM), flash memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage device, optical data storage devices, hard disks, solid-state disks (SSDs), and can be any device capable of storing machine readable instructions, associated data, data files, data structures, and providing machine readable instructions, associated data, data files, and data structure to the processor or computer so that the processor or computer can execute instructions.

While the disclosure has been shown and described with reference to various examples thereof, it will be understood that various changes in form and details may be made therein without departing from the spirit and scope of the disclosure as defined by the appended claims and their equivalents.

What is claimed is:

1. An image forming apparatus comprising:
an input interface;
an output interface;
a plurality of devices that each perform a corresponding function of the image forming apparatus;
a memory; and
a processor,
wherein the processor is to:
set a first memory size corresponding to each function corresponding to the plurality of devices;
output the first memory size for each of a number of enabled functions associated with the plurality of devices;
output information indicating a second memory size of a disabled function corresponding to a device of the plurality of devices and whether the second memory size is allocated to the disabled function;
alter, through the input interface, the second memory size to be temporarily usable by an enabled function of the number of enabled functions; and
adjust an allocation state of the second memory size to a user setting state.

2. The image forming apparatus of claim 1, wherein the processor is to output an option menu to select whether to temporarily use the disabled function corresponding to the second memory size, through the output interface.

3. The image forming apparatus of claim 2, wherein the processor, in a state where the disabled function corresponding to the second memory size is set to be temporary usable, based on the image forming apparatus logging on through the input interface and the disabled function corresponding to the second memory size being selected, is to:
reboot the image forming apparatus, and
temporarily allocate a third memory size to temporarily enable the disabled function with the altered memory size.

4. The image forming apparatus of claim 3, wherein the processor, based on logging out through the input interface, is to:
reboot the image forming apparatus, and
alter the third memory size temporarily allocated to the disabled function to disable the enabled disabled function again.

5. The image forming apparatus of claim 3, wherein the processor is to display, through the output interface, an item of an enabled function, an item of the disabled function, and an item of the function set to be the temporarily usable differently from each other.

6. The image forming apparatus of claim 1, wherein the processor, based on receiving a signal to alter the second memory size, is to:
generate a memory table including a state in which the second memory size is altered, and
allocate the second memory size to the number of enabled functions of the image forming apparatus based on the generated memory table.

7. The image forming apparatus of claim 1, wherein the processor is to display a memory size usable through the output interface.

8. The image forming apparatus of claim 1, wherein the function of the image forming apparatus comprises a fax function, a print function, or a scan function.

9. A method of setting a memory size, the method comprising:
- identifying a number of functions requiring memory related to a plurality of devices of an image forming apparatus;
- outputting a user interface window with information indicating whether a first function of the number of functions is enabled or disabled;
- outputting information indicating whether a first memory size corresponding to the first function is allocated;
- receiving a signal through an input interface to alter the first memory size when the first function is disabled; and
- altering the first memory size to be usable by a second function that is enabled according to a user setting state.

10. The method of claim 9, further comprising: outputting a menu with a first option to select whether to temporarily use the first function while the first memory size is altered.

11. The method of claim 10, further comprising:
- receiving a signal that the first option has been selected;
- rebooting the image forming apparatus; and
- temporarily allocating the first memory size to be usable by the first function while the first function is temporarily enabled.

12. The method of claim 11, further comprising:
- receiving a signal to disable the first function while it is temporarily enabled;
- rebooting the image forming apparatus; and
- altering the first memory size to no longer be usable by the first function.

13. The method of claim 9, wherein altering the first memory size according to the user setting state comprises, generating a memory table including a state in which the first memory size is altered and allocating the first memory size based on the generated memory table.

14. The method of claim 9, further comprising:
displaying a usable memory size.

15. A non-transitory computer readable medium with a program to execute a method of memory size setting recorded therein, comprising:
- instructions to identify a number of functions requiring memory related to a plurality of devices of an image forming apparatus;
- instructions to output a user interface window with information related to whether a function of an image forming apparatus is enabled;
- instructions to output information indicating whether a memory size is allocated to a disabled function; and
- instructions to adjust a memory allocation state to a user setting state by altering the memory size allocated to the disabled function to be temporarily usable by a different function.

* * * * *